(12) United States Patent
Ryder et al.

(10) Patent No.: US 9,897,305 B2
(45) Date of Patent: Feb. 20, 2018

(54) CONTROLLED ENVIRONMENT LIGHT FIXTURE

(71) Applicant: Clear-vu Lighting LLC, Central Islip, NY (US)

(72) Inventors: George B. Ryder, Wilton, CT (US); Agjah I. Libohova, East Setauket, NY (US)

( * ) Notice: Subject to any disclaimer, the term of this patent is extended or adjusted under 35 U.S.C. 154(b) by 303 days.

(21) Appl. No.: 14/711,734

(22) Filed: May 13, 2015

(65) Prior Publication Data

US 2015/0338084 A1 Nov. 26, 2015

Related U.S. Application Data

(60) Provisional application No. 61/992,859, filed on May 13, 2014.

(51) Int. Cl.
*F21S 8/00* (2006.01)
*F21V 31/00* (2006.01)
(Continued)

(52) U.S. Cl.
CPC ............ *F21V 31/005* (2013.01); *F21S 8/026* (2013.01); *F21V 3/04* (2013.01); *F21V 5/08* (2013.01); *F21V 15/013* (2013.01); *F21V 17/12* (2013.01); *F21V 19/005* (2013.01); *F21V 21/043* (2013.01); *F21V 21/047* (2013.01);
(Continued)

(58) Field of Classification Search
CPC .... F21S 8/026; F21S 8/028; F21S 8/03; F21S 8/04; F21V 15/013; F21V 21/04; F21V 23/009; F21V 31/005; F21W 2131/205; F21W 2131/208; F21Y 2105/00; F21Y 2105/10; G02B 6/0011; G02B 6/0051
See application file for complete search history.

(56) References Cited

U.S. PATENT DOCUMENTS 5,902,035 A 5/1999 Mui
6,871,983 B2 3/2005 Jacob et al.
(Continued)

FOREIGN PATENT DOCUMENTS

DE 1489335 A1 4/1969
JP S5336258 U 3/1978
(Continued)

OTHER PUBLICATIONS

Oct. 5, 2015 ISA and Written Opinion from related application PCT/US2015/030670.
(Continued)

*Primary Examiner* — Ali Alavi
(74) *Attorney, Agent, or Firm* — Zollinger & Burleson Ltd.

(57) ABSTRACT

Controlled environment light fixture configurations include an LED light source. The light fixtures can be installed and removed from below the ceiling. The light fixture can be installed and removed without opening the lens frame of the light fixture. The light fixture includes a sealed housing and seals to the ceiling when installed. The light fixtures are provided in exterior dimension sizes that allow the fixtures to be installed in a variety of controlled environment ceilings in recessed configurations. The lower surface exposed to the controlled environment is free of welds and grinds in order to provide a corrosion resistant surface.

42 Claims, 15 Drawing Sheets

(51) Int. Cl.

| | | |
|---|---|---|
| *F21V 19/00* | (2006.01) | |
| *F21V 21/30* | (2006.01) | |
| *F21V 21/04* | (2006.01) | |
| *F21V 29/76* | (2015.01) | |
| *F21V 29/89* | (2015.01) | |
| *F21V 8/00* | (2006.01) | |
| *F21V 5/08* | (2006.01) | |
| *F21S 8/02* | (2006.01) | |
| *F21V 3/04* | (2018.01) | |
| *F21V 15/01* | (2006.01) | |
| *F21V 17/12* | (2006.01) | |
| *F21V 23/00* | (2015.01) | |
| *F21V 29/507* | (2015.01) | |
| *F21V 29/74* | (2015.01) | |
| *F21W 131/205* | (2006.01) | |
| *F21Y 105/00* | (2016.01) | |
| *F21Y 115/10* | (2016.01) | |

(52) U.S. Cl.
CPC ............ *F21V 21/048* (2013.01); *F21V 21/30* (2013.01); *F21V 23/009* (2013.01); *F21V 29/507* (2015.01); *F21V 29/74* (2015.01); *F21V 29/763* (2015.01); *F21V 29/89* (2015.01); *G02B 6/0011* (2013.01); *G02B 6/0051* (2013.01); *F21W 2131/205* (2013.01); *F21Y 2105/00* (2013.01); *F21Y 2115/10* (2016.08)

(56) References Cited

U.S. PATENT DOCUMENTS

| | | | |
|---|---|---|---|
| 7,648,252 B2 | 1/2010 | Hawkins et al. | |
| 7,766,503 B2* | 8/2010 | Heiking | F21S 8/026 362/147 |
| 8,511,850 B2* | 8/2013 | Hawkins | F21V 31/005 362/217.05 |
| 2010/0195322 A1* | 8/2010 | Kawakami | F21S 2/00 362/231 |
| 2011/0242828 A1* | 10/2011 | Blincoe | F21V 29/004 362/373 |
| 2012/0155080 A1* | 6/2012 | Schupple | F21V 19/0055 362/235 |
| 2013/0027916 A1 | 1/2013 | Caferro et al. | |
| 2015/0369469 A1* | 12/2015 | Vamberi | F21S 8/022 362/153.1 |

FOREIGN PATENT DOCUMENTS

| | | |
|---|---|---|
| JP | S6060821 U | 4/1985 |
| JP | S6060821 U | 4/1985 |
| JP | 2011028970 A | 2/2011 |
| JP | 2012054199 A | 3/2012 |
| KR | 101373845 B1 | 3/2014 |

OTHER PUBLICATIONS

Jul. 28, 2015 PCT.ISA.206 from related application PCT/US2015/030670.

* cited by examiner

CONTROLLED ENVIRONMENT LIGHT FIXTURE

CROSS REFERENCE TO RELATED APPLICATIONS

This application claims the benefit of U.S. Provisional Patent Application Ser. No. 61/992,859 filed May 13, 2014; the disclosure of which are incorporated herein by reference.

BACKGROUND OF THE DISCLOSURE

1. Technical Field

This disclosure relates to light fixtures for controlled environments which include clean rooms, containment areas, surgical suites, and hazardous locations. The light fixture forms a seal between the controlled environment and the plenum environment and can be installed from below the ceiling of the controlled environment. The exemplary light fixture configurations are recessed within ceiling openings, seal to the lower surface of the ceiling structure, can be installed from below, and can support weight from above.

2. Background Information

Light fixtures for controlled environments such as clean rooms, containment rooms, surgical suites, and hazardous locations must be fabricated from inert materials, provide sealing functions, as well as providing desirable lighting properties. Controlled environment light fixtures are typically powered by an external power source and thus must provide a hermetically-sealed pathway for the power wires. The designers and users of controlled environments often want the light fixtures to be built into and recessed within the ceiling instead of hanging down from the ceiling support structures. These light fixtures must form a particulate and fluid impervious seal between the controlled environment and the plenum environment above the ceiling when the light fixture is installed. Standards and tests such as those defined by the National Sanitation Foundation protocols, the Medicines and Healthcare Products Regulatory Agency (MHRA) requirements, the National Environmental Balancing Bureau procedures must be met by components used in clean room construction.

The controlled environment can be located at any of a variety of facilities and the light fixture should be configurable for a variety of uses. For example, the light fixture may be used for applications such as pharmaceutical, biotech, biosafety, semi-conductor, surgical suite, and research facilities. The designers and users of these controlled environments desire light fixtures that can be configured with different light engines as well as providing a high quality, reliable seal. Different light distribution patterns are also desired for different applications. The light fixtures should be easy to install as well as being easy to maintain.

SUMMARY OF THE DISCLOSURE

Controlled environment light fixture configurations using LED light engines are disclosed. The light fixture configurations seal to the ceiling of the controlled environment, are easy to install, and maintain the LEDs in a sealed enclosure during use. The light fixtures are provided in sizes that fit multiple ceiling types.

In one configuration, the light fixture is sealed to the lower surface of the ceiling with a gasket having a first portion disposed between a housing of the light fixture and the lower surface of the ceiling. A lens frame of the light fixture engages a second portion of the same gasket to seal the enclosure of the light fixture. A single gasket is used to seal the enclosure to the ceiling and the lens frame to the ceiling. The single gasket can be carried by an outer flange of the housing.

In one configuration, the LED light fixture is configured to be used with a variety of ceiling types including 2.0" T-bar grid ceilings for controlled environment applications. The light fixtures are provided in sizes that fit the standard-size light openings for the 2.0" T-bar grid ceilings which allow the light fixtures to be used with other ceiling configurations as well.

In one configuration, the light fixture includes an LED light source that is mounted directly to the aluminum housing of the light fixture. The housing functions as the heat sink for the LED light source with the heat being transferred by conduction because of the direct connection between the two elements. The housing can include an integral LED mounting element.

In one configuration, the housing of the light fixture functions as a heat sink for the LED circuits that are mounted directly to the housing to provide cooling by way of conduction. The exemplary configuration of the housing includes an extruded envelope that functions as the LED mount and the integral heat sink for the LEDs. The ends of the envelope are received in slots defined by end caps with a seal disposed in the slots to define a sealed housing for the enclosure of the light fixture.

In one configuration, the light fixture can be installed from below the controlled environment ceiling without removing the lens frame of the light fixture. The mounting hardware is accessible from the exterior of the light fixture from below the fixture. The person installing the light fixture does not have to remove the lens frame in order to access the mounting hardware. The installer only needs to remove caps from the lens frame to access the mounting hardware. The caps are then replaced to seal the interior of the light fixture.

In one configuration, the light fixture locates the power supply for the LED light source within the enclosure. When the power supply is disposed within the enclosure, an electrical connector is provided that provides a quick connect plug-type connection between the LED power supply and the line power supply line providing electrical power to the light fixture. In another configuration, the LED power supply is disposed outward of the enclosure.

In one configuration, the lens frame has a room-facing stainless steel surface that is free of welds and grinding so the exposed face of the lens frame is resistant to corrosion from cleaning and disinfecting processes that occur in the controlled environment. The lens frame perimeter element is formed by deep drawing and trimming the stainless steel material.

In one configuration, the lens frame is secured to the envelope of the light fixture with connectors disposed near the perimeter of the light fixture close to the sealing gasket. These connectors terminate inside the enclosure of the light fixture. The connectors can be received in self-centering nuts carried by the enclosure.

In one configuration, the light fixture housing has an overall height of about two inches. The light fixture can be recessed within a two inch thick ceiling. One configuration can be mounted on top of a ceiling grid and one configuration can engage the lower surface of a ceiling grid. In these configurations, the light fixture lens frame extends down only short distance such as less than 0.75 inches and defines no right angle surfaces to the ceiling.

In one configuration, a support plate can be used above the enclosure of the light fixture to allow a person to walk on the support plate directly over the light fixture. The support plate can be a metal support plate such as a stainless steel or aluminum diamond plate material that extends outwardly from the perimeter of the light fixture to be self-supported on the ceiling support structure to allow at least one worker to stand directly above a light fixture above the ceiling.

In one configuration, the light fixture has a symmetric/asymmetric light distribution pattern. This LED light fixture can be used for the controlled environment of a surgical suite.

The preceding non-limiting aspects, as well as others, are more particularly described below. A more complete understanding of the processes and equipment can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure

BRIEF DESCRIPTION OF THE DRAWINGS

Similar numbers refer to similar parts throughout the disclosure.

DETAILED DESCRIPTION OF THE EXEMPLARY EMBODIMENTS

Figure 1:
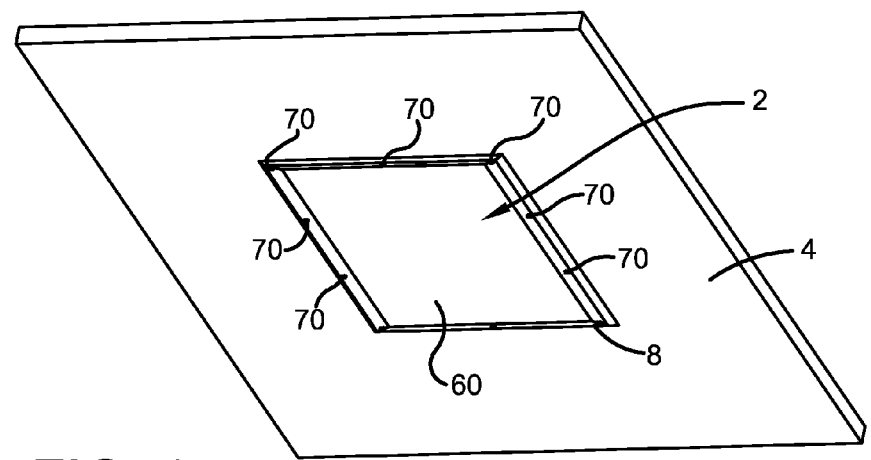
FIG. 1 is a bottom perspective view of an exemplary light fixture installed in a controlled environment ceiling.
Figure 2:
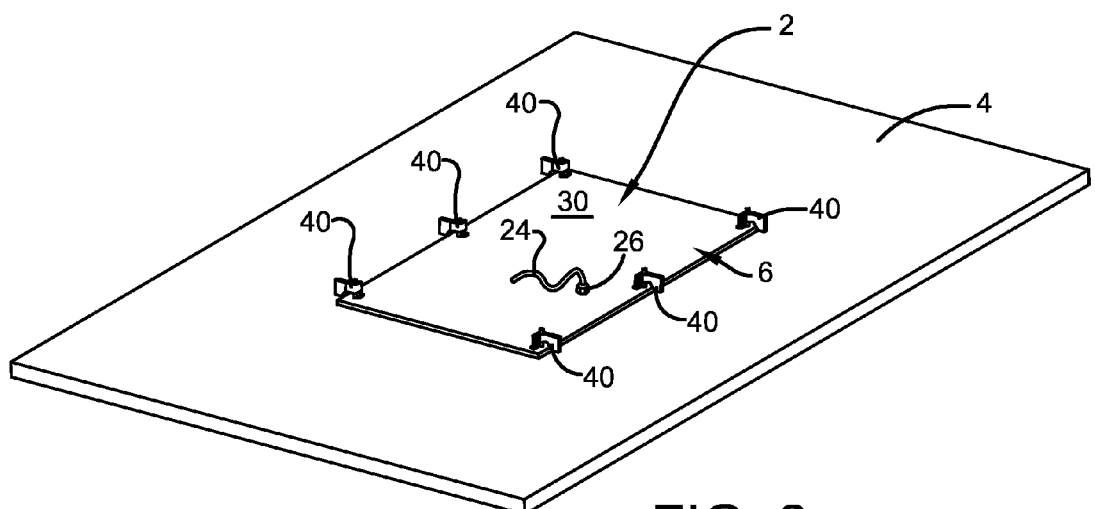
FIG. 2 is a top perspective view of FIG. 1.
Figure 3:
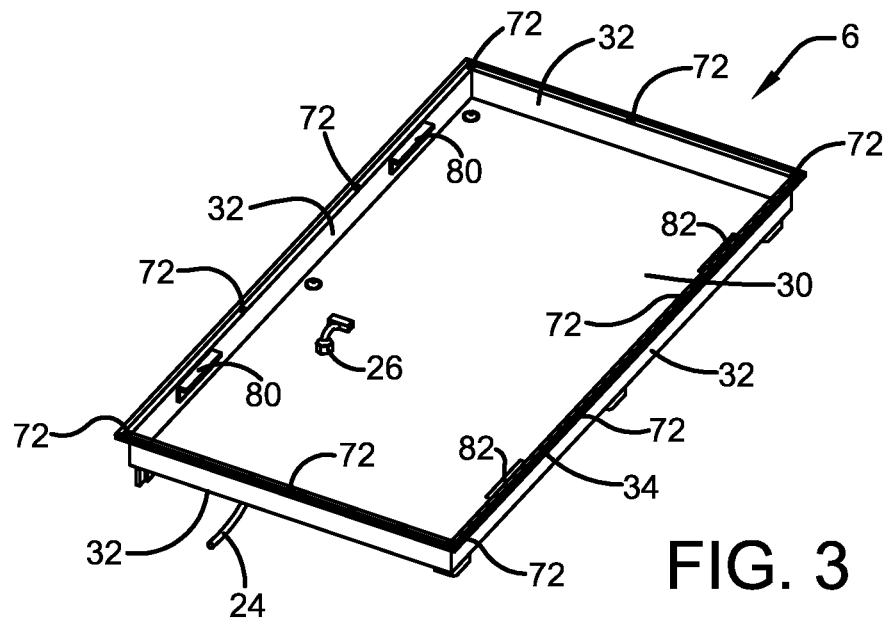
FIG. 3 is a perspective view looking into the enclosure for the exemplary light fixture of FIG. 1.
Figure 4:
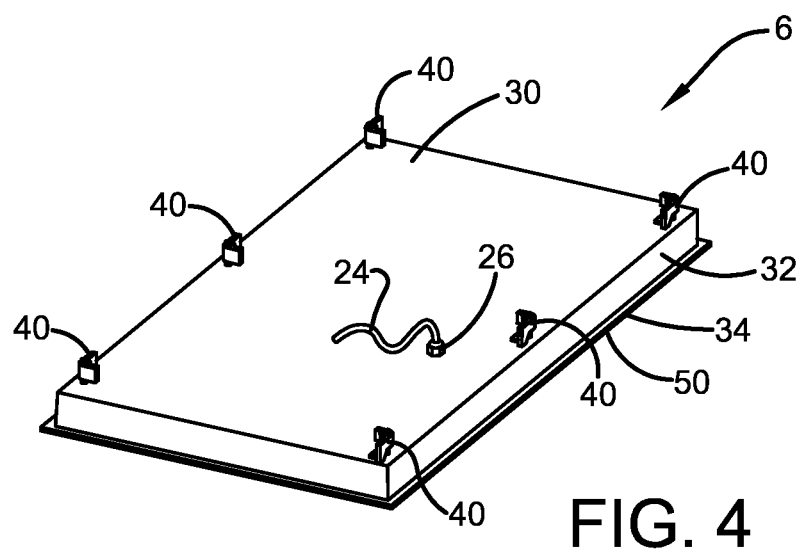
FIG. 4 is a perspective view looking down onto the top of the exemplary light fixture of FIG. 1.
Figure 5:
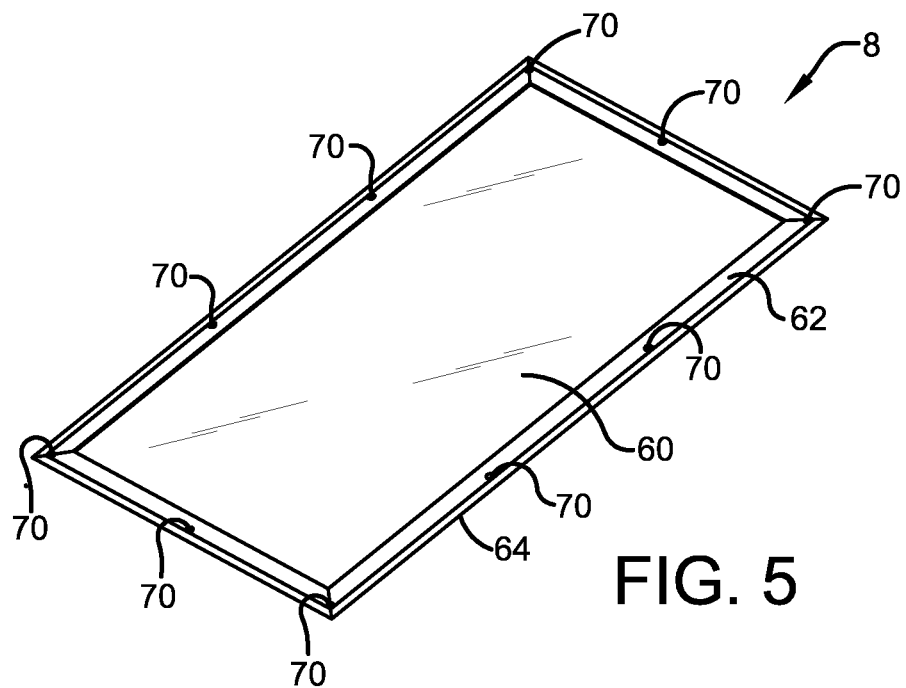
FIG. 5 is a perspective view looking up at an exemplary lens frame.
Figure 6:
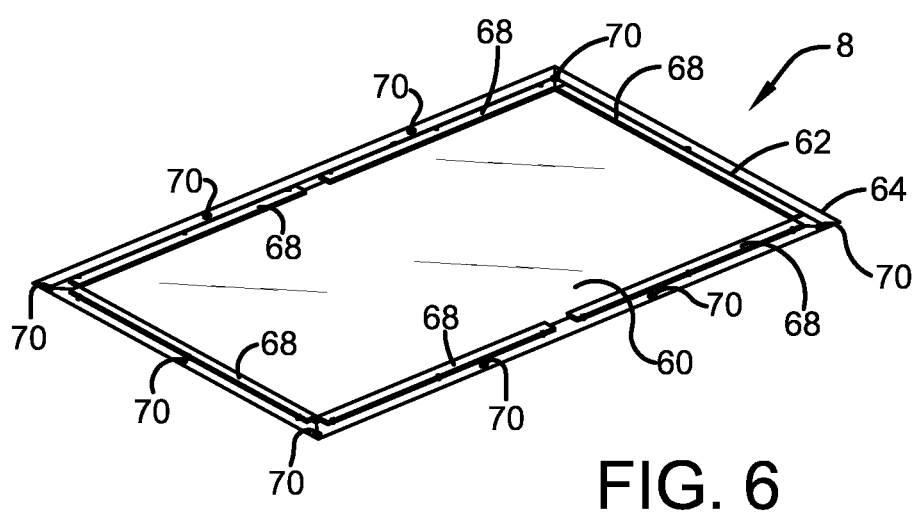
FIG. 6 is a perspective view looking down onto the top of the exemplary lens frame of FIG. 5.
Figure 7:
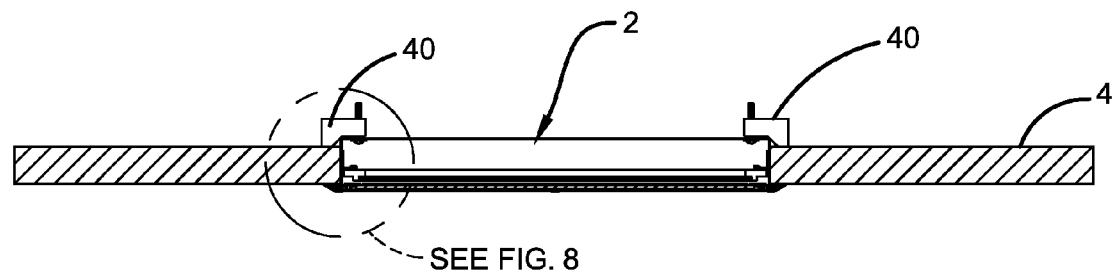
FIG. 7 is a section view showing the installation of the exemplary light fixture.

A first exemplary embodiment of a light fixture that can be used in a controlled environment such as a clean room is indicated generally by the reference numeral 2 in the accompany drawings. These light fixtures also can be used in ceilings other than those for controlled environments. For example, there are some ceilings where mounting a light fixture from below is desirable and some where there is little head room above the ceiling to receive the light fixture. Light fixture 2 is adapted to be recessed within an opening defined by ceiling 4 and to seal to a lower surface of ceiling 4. Ceiling 4 can be any of a variety of ceiling types used in controlled environment construction including, but not limited to, drop ceilings that use T-bar support grids and drop panels, panel systems that can be walkable, and flat ceilings such as gypsum ceilings. Although the T-bar support grids for controlled environment ceilings usually have upwardly disposed seals which support panels, light fixture 2 has a seal configuration that engages the downward facing surface of the T-bar which is part of the lower surface of ceiling 4. Light fixture 2 generally includes a housing 6, a lens frame 8, and a light engine 10. Once installed in ceiling 4, light fixture 2 forms a seal between the controlled environment below light fixture 2 and the plenum environment above light fixture 2.

In this description, the directions up and down, upward and downward, upper and lower, as well as above and below, are with reference to a ceiling in a controlled environment with the light fixtures disposed substantially horizontal with the controlled environment below the light fixture and the plenum disposed above the light fixture. The term outward refers to a direction from the interior of the light fixture toward the exterior of the light fixture.

Light fixture 2 may be provided in a variety of sizes and shapes including rectangles and circular frames. The rectangular frames may be sized for what is commonly called a 1×4, 2×2, and 2×4 foot light openings. These descriptions reference the approximate sizes of the light openings defined by a grid ceiling system. Light fixture 2 is configured to prevent moisture and air leakage by sealing to the lower surface of the ceiling structure when the light fixture is installed. The light fixture enclosures are sized to fit 2.0" T-bar grid size light openings for controlled environment ceilings and thus can be used in other ceiling applications such as panel and gypsum ceilings without modification. For example, the 1×4 light fixture has an enclosure depth above the lower surface of the ceiling of 2.0 inches and a 0.625 inch height below the lower surface of the ceiling. The mounting arms extend higher and can extend up to 4.687 inches above the lowermost surface of light fixture 2. The overall length is 47.937 inches with an overall width of 11.937 inches so that light fixture 2 will engage the lower surfaces of the 2.0" T-bar grid. Housing 6 has a length of 45.437 inches and a width of 9.437 inches to fit within an opening of 9.75 inches by 45.75 inches defined by the 2.0" T-bar grid. For example, the 2×2 light fixture has an enclosure depth above the lower surface of the ceiling of 2.0 inches and a 0.625 inch height below the lower surface of the ceiling. The mounting arms extend higher and can extend up to 4.687 inches above the lowermost surface of light fixture 2. The overall length is 23.937 inches with an overall width of 23.937 inches so that light fixture 2 will engage the lower surfaces of the 2.0" T-bar grid. Housing 6 has a length of 21.437 inches and a width of 21.437 inches to fit within an opening of 21.75 inches by 21.75 inches defined by the 2.0" T-bar grid. For example, the 2×4 light fixture has an enclosure depth above the lower surface of the ceiling of 2.0 inches and a 0.625 inch height below the lower surface of the ceiling. The mounting arms extend higher and can extend up to 4.687 inches above the lowermost surface of light fixture 2. The overall length is 47.937 inches with an overall width of 23.937 inches so that light fixture 2 will engage the lower surfaces of the 2.0" T-bar grid. Housing 6 has a length of 45.437 inches and a width of 21.437 inches to fit within an opening of 45.75 inches by 21.75 inches defined by the 2.0" T-bar grid.

In one exemplary configuration, light engine 10 includes an edge lit LED panel 20 as the light source for the light fixture, a power supply 22, and power cord 24 as well as the electrical connections between power supply 22 and the LED circuit boards. In other configurations, light engine 10 can include an LED light source configured for direct lighting or indirect lighting. In one example of direct lighting, the LED light source of light engine 10 output their light in a direction substantially perpendicular to lens frame 8. In an example of indirect lighting, light engine 10 includes LEDs that output light in a direct substantially parallel to lens frame 8. In the indirect lighting configurations, reflectors are used inside housing 6 to reflect light out trough lens frame 8. In any of these configurations, a diffuser can be used for the light entering lens frame 8 or the lens of lens frame 8 can diffuse the light. The LEDs can be provided in a variety of lumen outputs and colors as well as being dimmable.

Power cord 24 passes through housing 6 and the pass-through location is hermetically sealed with a seal 26 or a through connector 26 that forms a hermetic seal. A benefit of light fixture 2 is that light engine 10 can include commercially available edge lit LED panels. Another benefit is power supply 22 is individual to panel 20 and can be contained within housing 6 above panel 20. When power supply 22 is disposed within housing 6, a quick-connect electrical connector can be used to form the electrical connection between power cord 24 and the power supply 22 of light engine 10. In other configurations, power supply 22 can be disposed outside housing 6.

Housing 6 generally includes a base wall 30, a continuous sidewall 32, and an upwardly-facing mounting surface that seats under ceiling 4 when light fixture 2 is installed. The upwardly-facing mounting surface can be provided on a variety of structures that form part of housing 6 such a flange or flanges, a channels, a beam, or a projection regardless whether it is solid or hollow. In the exemplary configuration depicted in the drawings and described herein, a flange 34 projects from sidewall 32 and defines the upwardly-facing mounting surface. All seams and corners between these walls and the flange are closed and sealed to define a one piece, sealed enclosure body. Housing 6 can be made from aluminum, galvanized steel, stainless steel, or a polymer. When housing 6 is formed from metal, the seams and corners can be welded so that no air can pass through the seams or corners. In the exemplary configuration, housing 6 is rectangular and includes four corners that are welded closed. Housing 6 can be made from aluminum with welded corners and an unplasticized PVC finish. The corners of housing 6 also can be sealed with a sealing material placed at the exterior of the corners. Sidewall 32 has a height that provides a depth to housing 6 sufficient to receive light engine 10. Sidewall 32 may be configured for use with a two inch ceiling panel. Flange 34 extends outwardly from the lower edge of sidewall 32 and also may have welded corners. Flange 34 is configured for the ceiling installation. Flange 34 can be configured to work with 1.5 inch or 2.0" T-bar ceilings. Flange 34 can be configured for a gypsum ceiling with a two inch U-channel.

Figure 8:
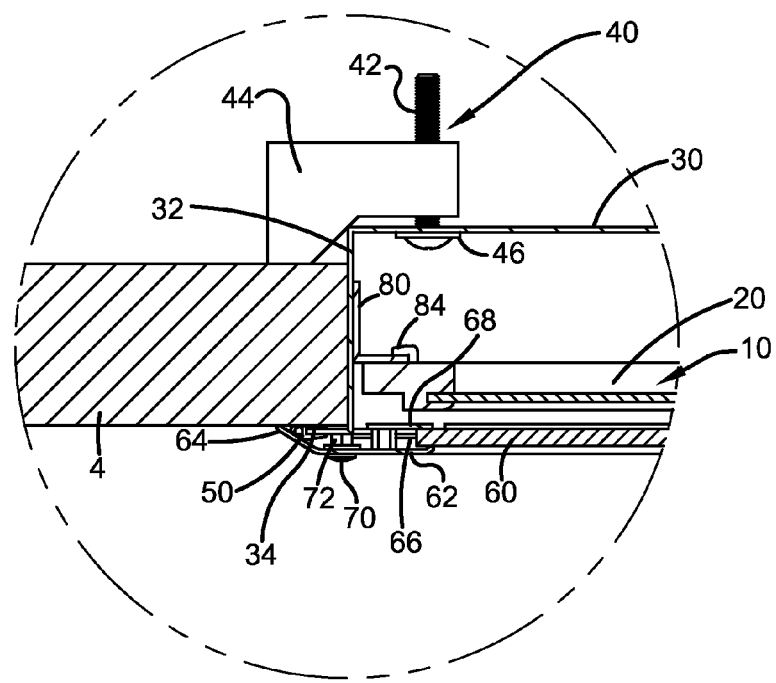
FIG. 8 is an enlarged view of the encircled portion of FIG. 7.
Figure 9:
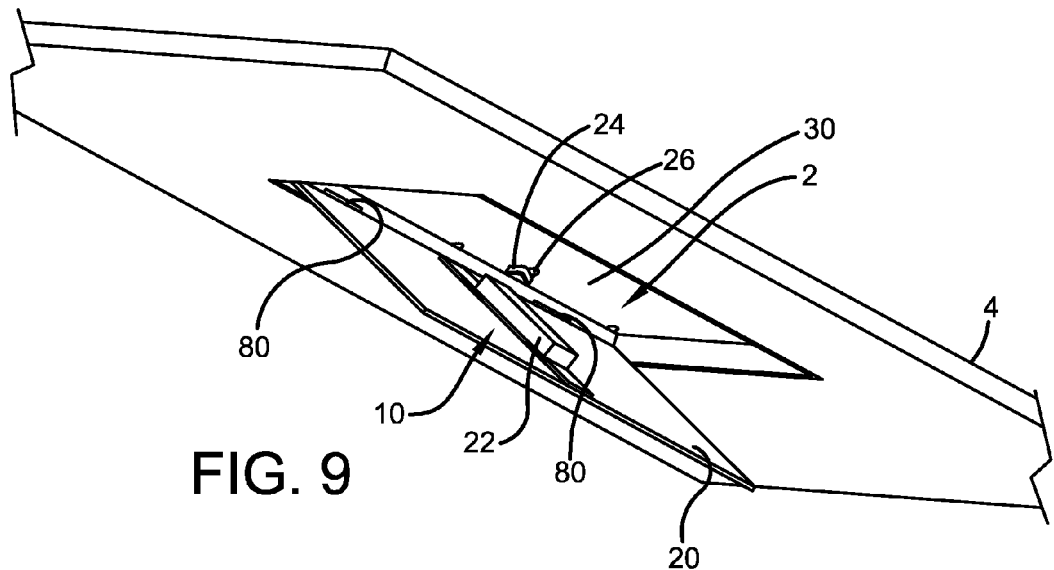
FIG. 9 is a perspective view of the edge lit LED light engine being installed in the enclosure.
Figure 10:
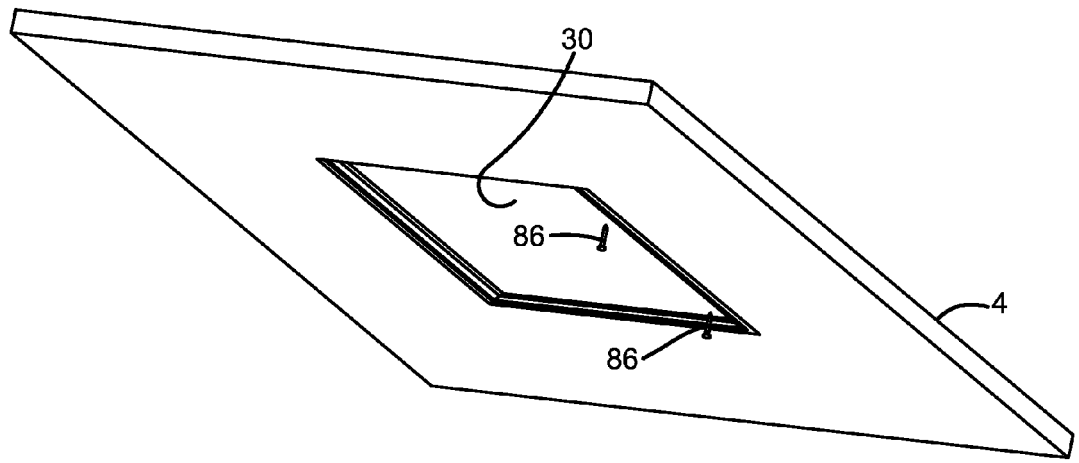
FIG. 10 is a perspective view of another step of the installation of the LED light engine being installed.
Figure 11:
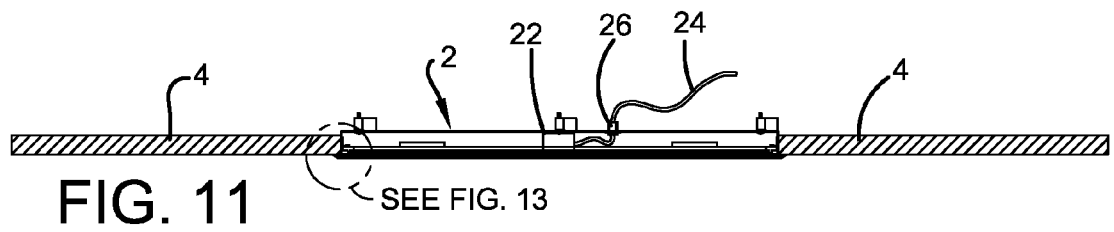
FIG. 11 is a section view showing the light fixture installed in a ceiling.
Figure 12:
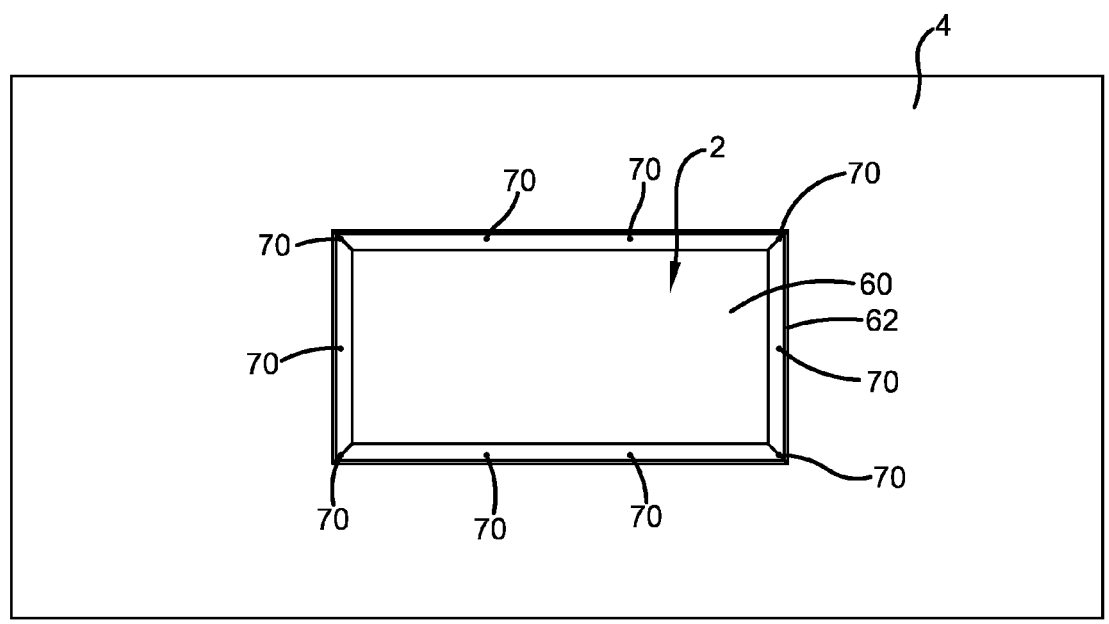
FIG. 12 is a view looking up at the light fixture installed in a ceiling.
Figure 14:
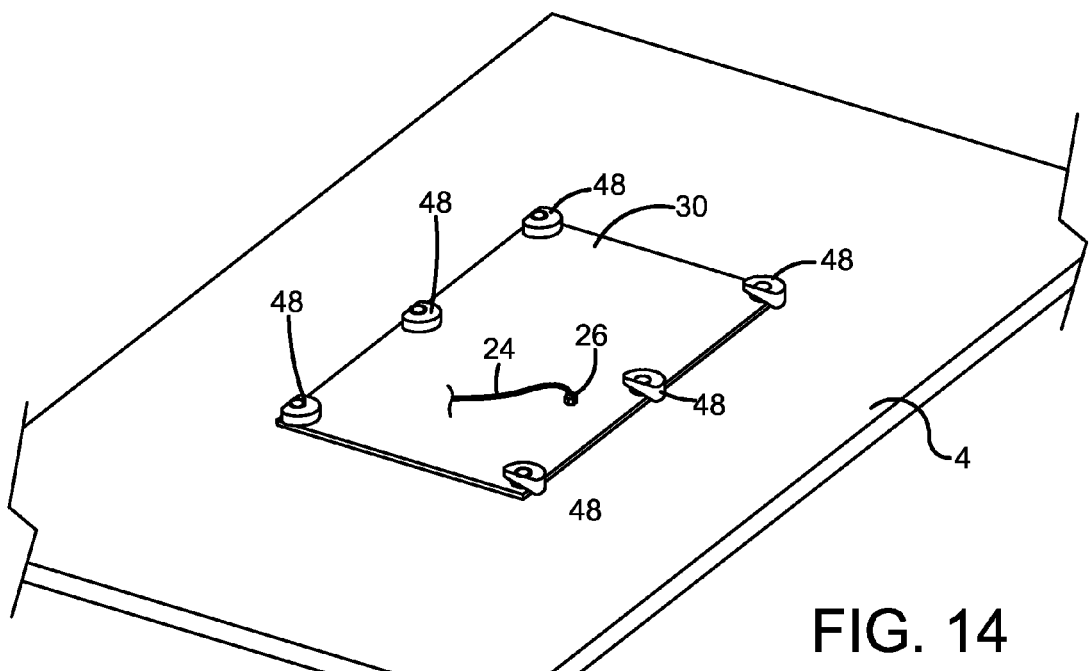
FIG. 14 is a perspective view looking down on an alternative lighting fixture installed in a ceiling.
Figure 15:
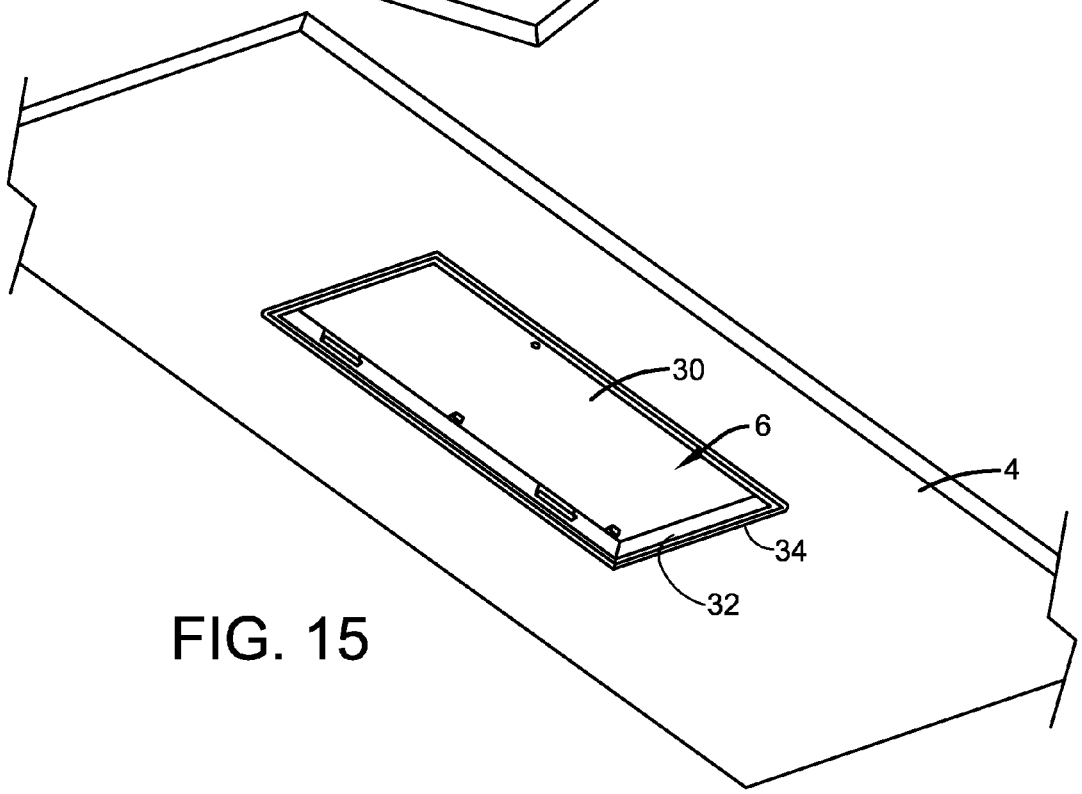
FIG. 15 is a perspective view looking up into the enclosure of FIG. 15.
Figure 16:
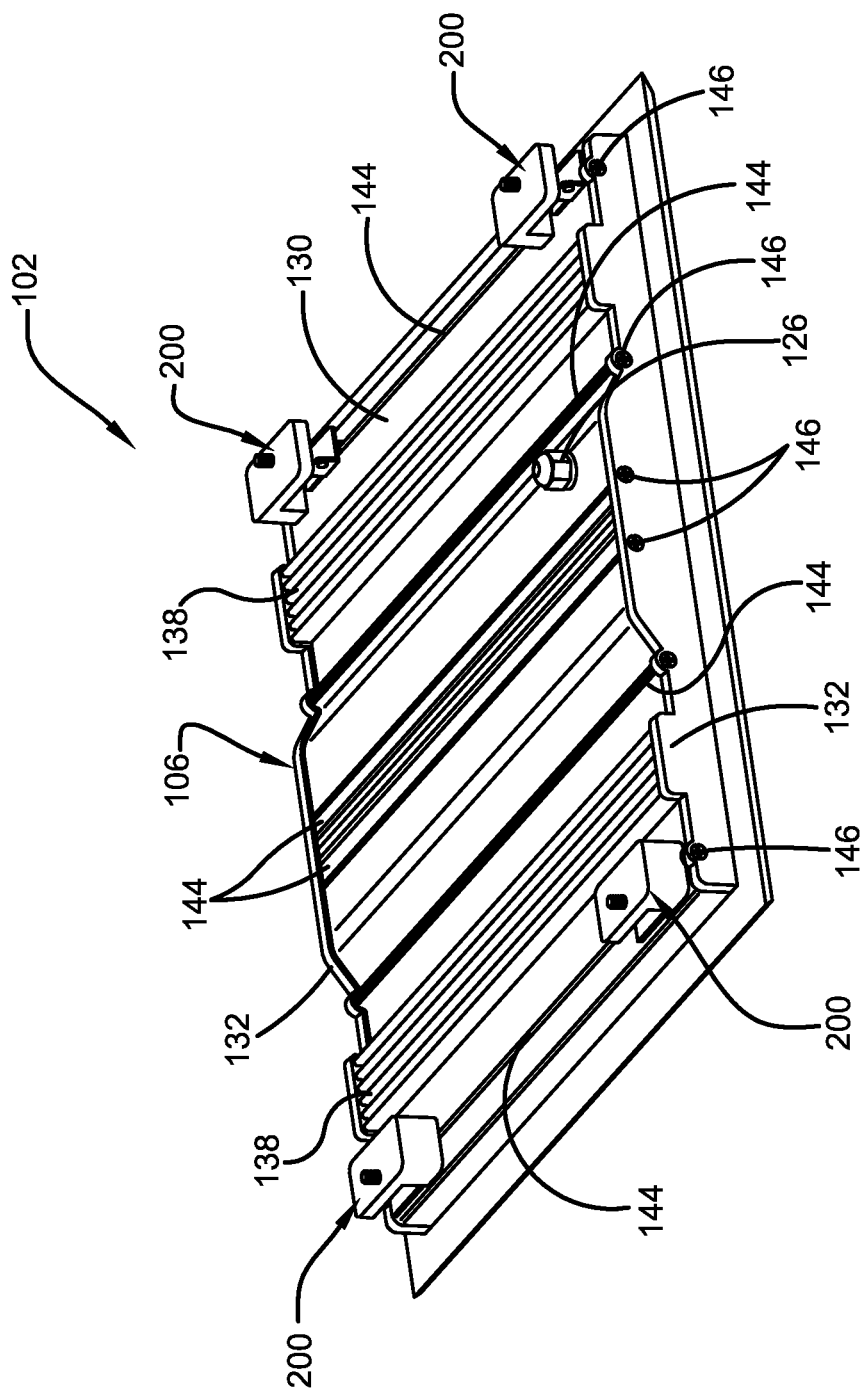
FIG. 16 is a perspective view of the top of another exemplary light fixture for a controlled environment ceiling.
Figure 17:
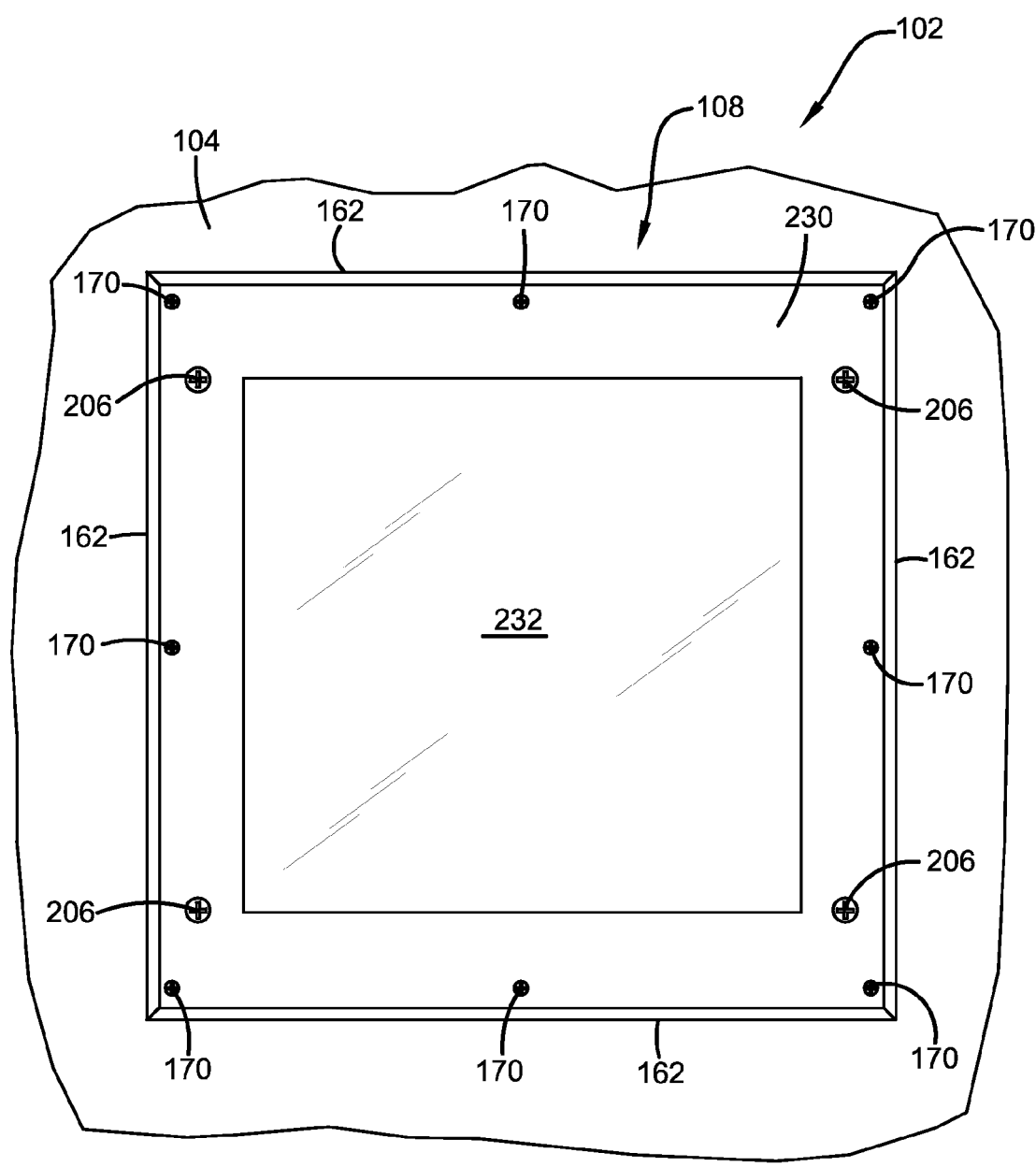
FIG. 17 is a bottom plan view (one looking up at the light fixture) of the light fixture of FIG. 16 mounted in a ceiling.

Housing 6 is secured to ceiling 4 with a plurality of swing arm mount brackets 40. Each bracket 40 includes a post 42 that extends through base wall 30 to support a mounting arm 44 having a portion that can be moved over ceiling 4 as shown in FIG. 8. Mounting arm 44 is initially disposed over base wall 30 so that housing 6 can be moved up into an opening defined by ceiling 4 from below. The installer then moves each mounting arm 44 over ceiling 4 by rotating post 42. After mounting arm 44 is disposed over ceiling 4 and housing 6 is supported by mounting arms 44, the installer tightens brackets 40 to clamp a gasket 50 carried by flange 34 against the lower surface of ceiling 4. This is accomplished by rotating posts 42 until they are tight. Post 42 is threaded through bracket 40 so that post 42 can be rotated to tighten flange 34 against ceiling 4. In an optional configuration, mounting arm 44 can be configured to engage the corner of housing 6 between sidewall 32 and base wall 30 so that the installation cannot be over tightened (shown in FIG. 8). A seal 46 seals the opening in base wall 30 that receives post 42. In the alternative configuration of FIG. 14, swing arm mounting brackets 40 include cammed mounting arms 48. Each of cammed mounting arms 48 can be rotated to a position where it is entirely disposed above base wall 30 and a plurality of other positions where arm 48 is disposed over ceiling 4. The ceiling-facing surface of cammed mounting arm 48 defines a cam having a ramped thickness so that the clamping force is increased as post 42 is turned. Rotation of cammed mounting arms 48 pull flange 34 up toward ceiling 4. Mounting brackets 40 allow housing 6 to be installed from below ceiling 4.

In another configuration of housing 6 that is installed with access to enclosure from above, no portion of mounting brackets 40 extends through housing 6. These brackets 40 are manipulated and tightened from above.

Figure 13:
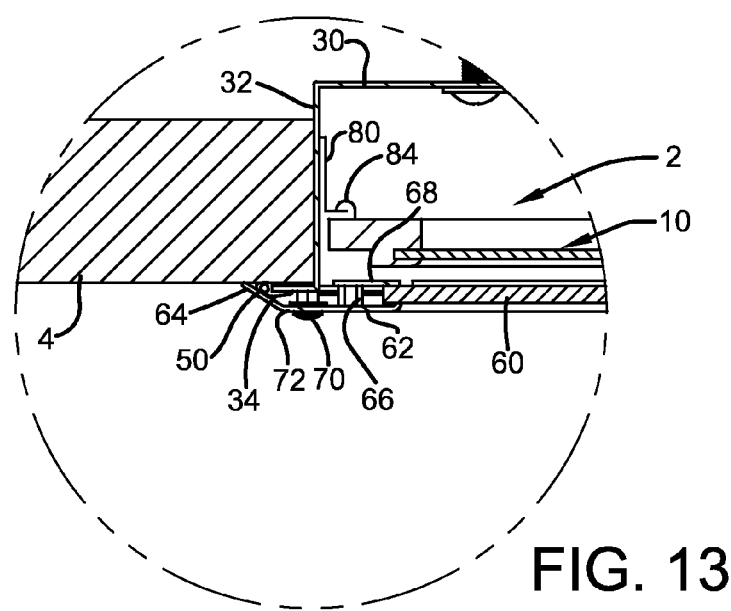
FIG. 13 is an enlarged view of the gasket that forms the seal between the lens frame and the ceiling.

Light fixture 2 uses a single gasket 50 disposed over the end of flange 34 to provide the seal between ceiling 4 and the exterior of housing 6. This gasket 50 is compressed between ceiling 4 and flange 34 as shown in FIGS. 8 and 13 when mounting brackets 40 are tightened. As described below, gasket 50 also defines the seal between housing 6 and lens frame 8. Gasket 50 can be an extruded, U-shaped gasket with opposed legs that slide over flange 34. Gasket 50 can be vulcanized. Gasket 50 can be made from a NSF-approved material. Gasket 50 can be a closed cell foam material. Gasket 50 can be a vulcanized rubber. Gasket 50 can be extruded or molded in an elongated shaped. The ends of gasket 50 are spliced with the corner locations notched so gasket 50 can be bent around the corners of housing 6. Gasket 50 also can be formed from a plurality of individual sections that are spliced at the corners of housing 6. Gasket 50 can be secured to flange 34 with an adhesive or by a friction fit.

Lens frame 8 is used to enclose light engine 10 within housing 6. Lens frame 8 includes a lens 60 that allows light to pass through. Lens 60 is carried by frame 62 that defines a lip 64 having an upper surface that engages gasket 50 when lens frame 8 is connected to housing 6. Lip 64 is angled upwardly toward ceiling 4 when lens frame 8 is installed and defines a smooth sealing surface that engages gasket 50. The engagement of lip 64 with gasket 50 also helps hold gasket 50 against ceiling 4.

Lens 60 may be 0.187" clear tempered glass, 0.125" clear high impact acrylic, 0.125" amber high impact acrylic, or other materials as desired for a particular application. Lens 60 can be used to disperse the light from light engine 10 or to tint the light.

Lens frame 8 defines a slot 66 that receives the edge of lens 60. Slot 66 is defined by a cantilevered arm 68. The connection between perimeter frame 62 and lens 60 is sealed. The seal can be formed with a tape such as a very high bond (VHB) tape which can be a closed cell foam acrylic tape. Other sealing materials and structures can be used to seal lens 60 to frame 62. Frame 62 can be made from overlapping 18-gauge stainless steel (Type 304 and Type 316). Lip 64 can be defined by a 60 degree beveled edge. The corners of frame 62 are welded (TIG welded and ground smooth). Frame 62 can have a 2B finish that is passivated (the protective oxide layer on stainless steel has been restored or regenerated after the parts have been fabricated or welded). Frame 8 also can have an unplasticized PVC finish that is anti-microbial. Frame 62 also can be made from extruded aluminum that is anodized. The corners are closed to form a seal. Frame 62 also can be made from plastic.

Lens frame 8 is mounted to housing 6 with a plurality of fasteners 70 that are received in bosses 72 disposed inwardly of the portion of gasket 50 disposed under flange 34. Bosses 72 may be carried by flange 34. Bosses 72 may be threaded nuts that threadedly receive fasteners 70. Bushings may be used with the connection between fasteners 70 and bosses 72. The bushings can be Teflon®. Fasteners 70 can be flush with the exterior of frame 62 when tightened. Lens frame 8 can provide a second seal to light fixture 2 that seals the interior of housing 6.

Light engine 10 is mounted to housing 6 by connecting one edge of light engine 10 to mounting brackets 80 one on side of housing 6 with clips 84 that allow light engine 10 to pivot down away from housing 6. The other side of light engine 10 is secured to mounting brackets 82 with threaded fasteners 86. These connections do not extend through housing 6 and provide for quick mounting and dismounting of light engine 10 within housing 6. In another configuration, housing 6 is provided with a base wall 30 that swings up to allow light engine 10 to be installed and serviced from above.

A support plate such as a diamond plate metal can be used over the top of housing 6 to allow workers to walk on the top of housing 6 when such weight support is desired.

A second exemplary embodiment of a light fixture that can be used in a controlled environment ceiling is indicated generally by the reference numeral 102 in FIGS. 16-23. Light fixture 102 is adapted to be recessed into an opening defined by a ceiling 104. Ceiling 104 can be any of a variety of ceiling types used in controlled environment ceiling construction including, but not limited to, drop ceilings that use T-bar support grids and drop panels such as 2.0" T-Bar grids, panel systems that can be walkable such as 5×10 ceiling panels, and flat ceilings such as gypsum ceilings. Light fixture 102 generally includes a light engine and an enclosure. The enclosure dissipates heat from the LEDs, impedes leakage from the plenum while facilitating stringent cleaning protocols (NSF Protocol P442), provides IP66 ingress protection for the enclosure (IEC60598), minimizes surface contamination (NSF2), and operates safely in hazardous locations (Class I, Division 2). The enclosure includes a housing 106 and a lens frame 108 that is connected to and sealed to housing 106 to define a sealed environment for at least the LEDs of the light engine. When installed in ceiling 104, light fixture 102 forms a seal between the controlled environment below light fixture 102 and the plenum environment above ceiling 104 that carries light fixture 102.

Light fixture 102 may be provided in a variety of sizes and shapes including rectangles and circular frames. The rectangular frames may be sized for what is commonly called a 1×4, 2×2, and 2×4 foot light openings. These descriptions reference the approximate sizes of the light openings defined by a grid ceiling system. Light fixture 102 is configured to prevent moisture and air leakage by sealing to the lower surface of the ceiling structure when the light fixture is installed. The light fixture enclosures are sized to fit 2.0" T-bar grid size light openings for controlled environment ceilings and thus can be used in other ceiling applications such as panel and gypsum ceilings without modification. For example, the 1×4 light fixture has an enclosure depth above the lower surface of the ceiling of 2.0 inches and a 0.625 inch height below the lower surface of the ceiling. The mounting arms extend higher and can extend up to 4.687 inches above the lowermost surface of light fixture 102. The overall length is 47.937 inches with an overall width of 11.937 inches so that light fixture 102 will engage the lower surfaces of the 2.0" T-bar grid. Housing 106 has a length of 45.437 inches and a width of 9.437 inches to fit within an opening of 9.75 inches by 45.75 inches defined by the 2.0" T-bar grid. For example, the 2×2 light fixture has an enclosure depth above the lower surface of the ceiling of 2.0 inches and a 0.625 inch height below the lower surface of the ceiling. The mounting arms extend higher and can extend up to 4.687 inches above the lowermost surface of light fixture 102. The overall length is 23.937 inches with an overall width of 23.937 inches so that light fixture 102 will engage the lower surfaces of the 2.0" T-bar grid. Housing 106 has a length of 21.437 inches and a width of 21.437 inches to fit within an opening of 21.75 inches by 21.75 inches defined by the 2.0" T-bar grid. For example, the 2×4 light fixture has an enclosure depth above the lower surface of the ceiling of 2.0 inches and a 0.625 inch height below the lower surface of the ceiling. The mounting arms extend higher and can extend up to 4.687 inches above the lowermost surface of light fixture 102. The overall length is 47.937 inches with an overall width of 23.937 inches so that light fixture 102 will engage the lower surfaces of the 2.0" T-bar grid. Housing 106 has a length of 45.437 inches and a width of 21.437 inches to fit within an opening of 45.75 inches by 21.75 inches defined by the 2.0" T-bar grid.

In this description, the term "LED light source" includes a single LED, an array of LEDs, a plurality of LEDs, and any of these taken alone or combined as a group on a circuit board or supporting member. As such, when the LED light source is said to be mounted to another element, this means both that (1) a circuit board carrying LEDs is mounted and that (2) the individual LED or LEDs are mounted.

In one configuration of the second exemplary configuration, the light engine includes at least one LED light source 112 that includes plurality of individual LEDs 111 mounted to a strip-shaped circuit board, a light guide plate 114, a power supply 122, a power cord 124, and the electrical connections between power supply 122 and strip 112. LED light source 112 is mounted vertically so that the light shining out of the LEDs 111 is directed sideways (parallel to the body of lens frame 108) into the edge of light guide plate 114. Light guide plate 114 can be disposed close to or directly against the LEDs 111. This ensures no individual diode creates a bright spot viewable from below fixture 102 and that essentially all of the light output by LEDs 111 is received by light guide plate 114. A reflector 113 is integrally formed with or disposed on or above the upper surface of light guide plate 114 to reflect light back towards lens frame 108. A light diffuser 115 is disposed under light guide plate 114 or formed integrally therewith. Light diffuser 115 can be a separate plate member, a coating applied to light guide plate 114, a surface treatment such as etchings made in light guide plate 114, or members disposed within the body of light guide plate 114. These options may be used in combination with each other. In one exemplary configuration wherein light fixture 102 is used in a controlled environment for a surgical suite, light guide plate 114 and/or diffuser 115 provide an asymmetric/symmetric light distribution pattern for above the surgical table. Light guide plate 114, reflector 113, and diffuser 115 can be carried by housing 106 or by lens frame 108.

In other configurations, the light engine can provide a direct lit, up-lit, or back lit lighting configuration or a combination of these wherein a light guide plate 114 is not used. In a direct lit configuration, LED light sources 112 can be mounted directly to reflectors 116 or mounted in another location to output light substantially perpendicular to lens frame 108. The light engine also can use one or more indirect LED light sources 112 such as those that shine up and reflect the light off of reflectors 116 or LED light sources 112 that output parallel to lens frame 108 and are reflected from reflectors 116. LED light sources 112 can be provided in a variety of lumen outputs and colors and can be dimmable. Power cord 124 passes through housing 106 and the pass through location is hermetically sealed with a seal 126 or a through connector 126 that forms a hermetic seal. A benefit with light fixture 102 is that one or more power supplies 122 provided for strip 112 or strips 112 are contained within housing 106. When power supply 122 is disposed within housing 106, a quick-connect electrical connector can be used to form the electrical connection between power cord 124 and the power supply 122 of light engine 110. In other configurations, power supply 122 can be disposed above housing 106 with the power supply lines extending through the sealed connector 126.

Housing 106 generally includes an envelope 130 and a pair of end caps 132. Envelope 130 and end caps 132 cooperate to define an upwardly-facing mounting surface that is disposed under ceiling 104 when light fixture 102 is installed. When ceiling 104 is a grid and panel style ceiling, the upwardly-facing mounting surface is disposed under a portion of the grids that define the light opening. The upwardly-facing mounting surface can be provided on a variety of structures that form part of housing 106 such a flange or flanges, a channels, a beam, or a projection regardless whether it is solid or hollow. In the exemplary configuration depicted in the drawings and described herein, a flange 134 projects outwardly about the entire perimeter of housing 106 to define the upwardly-facing mounting surface. The upper surface of flange 134 is disposed under ceiling 104 when light fixture 102 is installed. Flange 134 supports the gasket that seals light fixture 102 to the ceiling.

Figure 18:
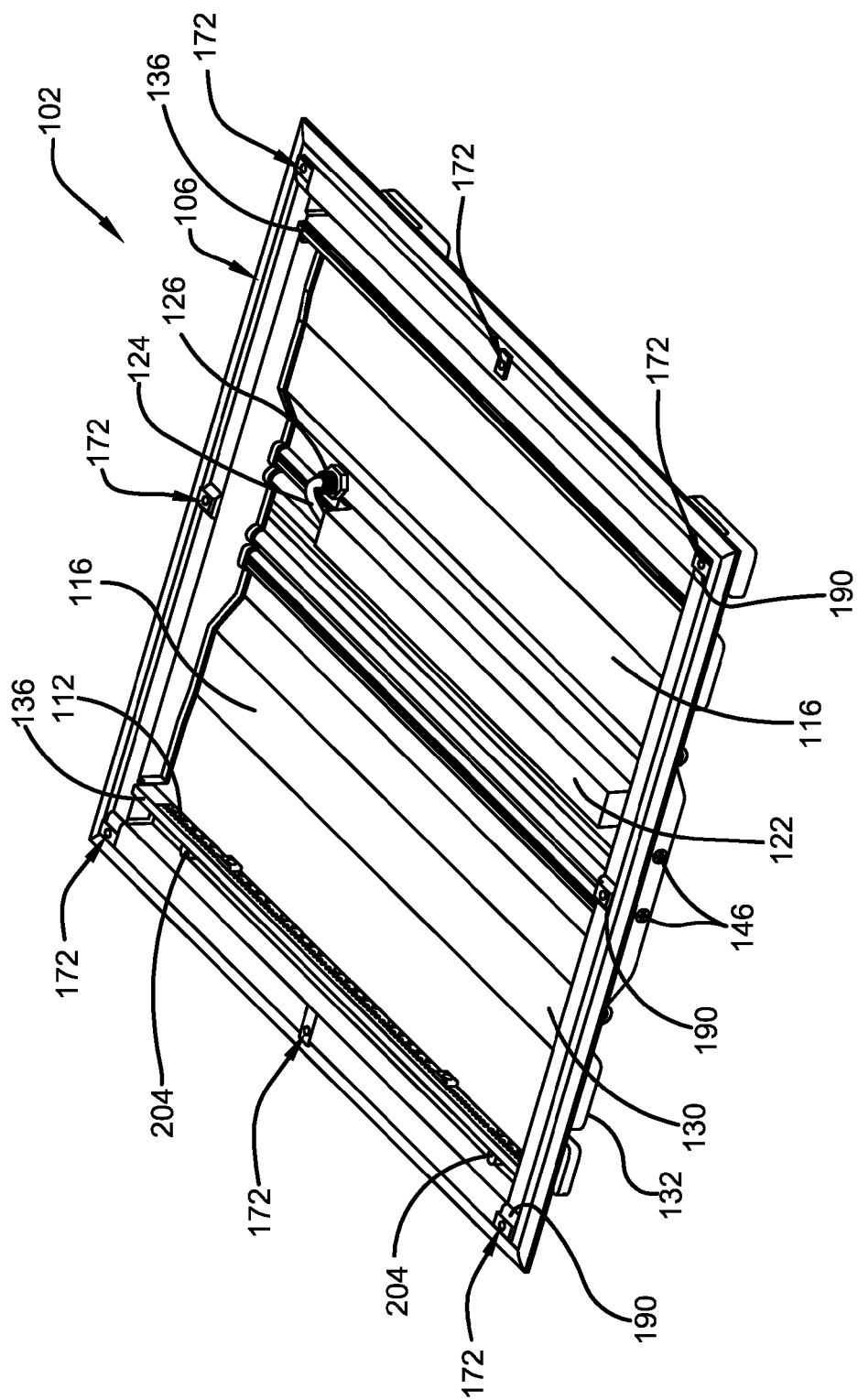
FIG. 18 is a perspective view looking into the enclosure of the light fixture of FIG. 16.
Figure 21:
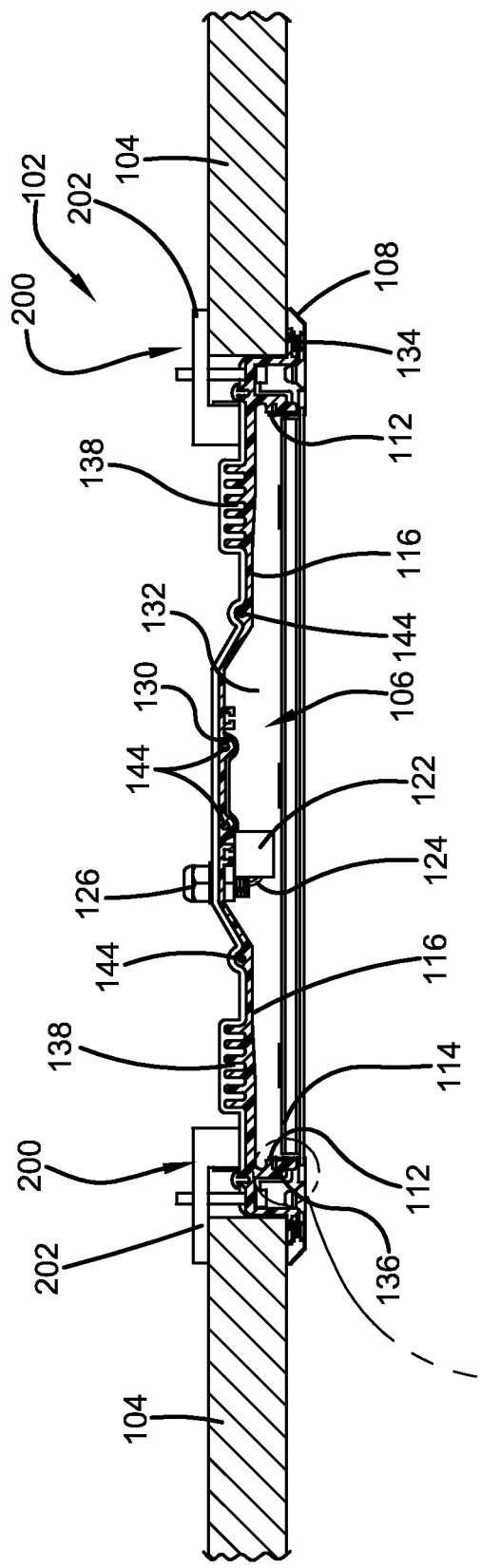
FIG. 21 is a section view taken through the middle of the envelope.
Figure 21:
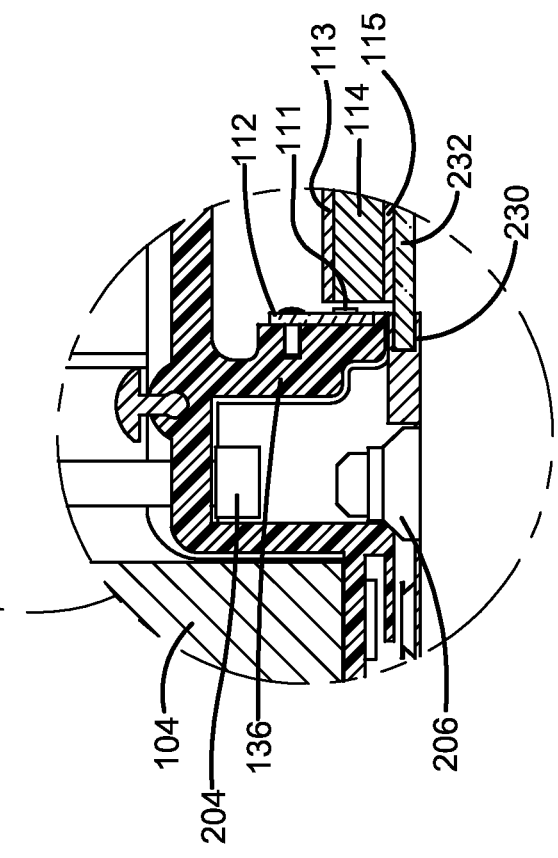
Figure 22:
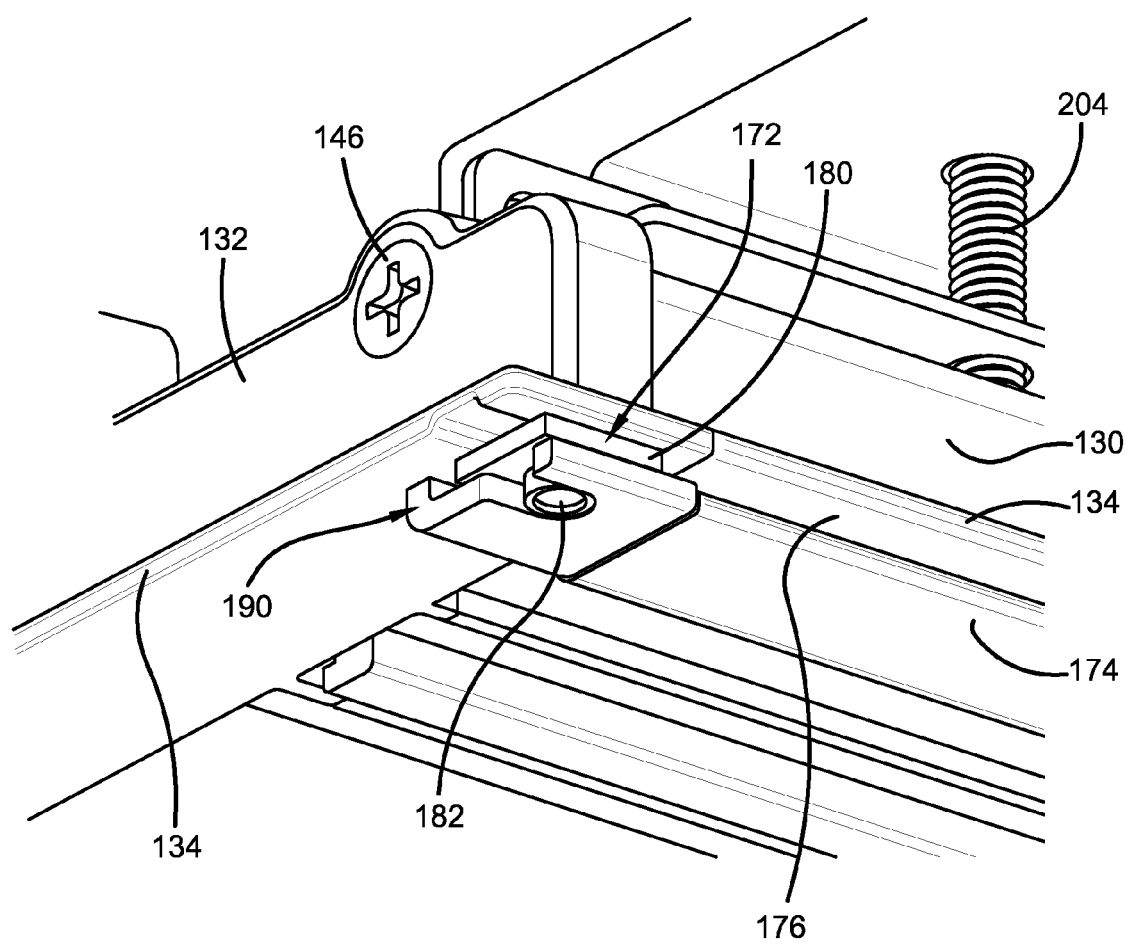
FIG. 22 is a perspective view looking up at the corner of the enclosure.

Envelope 130 is a unitary body and is made from a material that conducts heat away from LED strips 112. The exemplary configuration provides envelope 130 as an aluminum structure that functions as a conductive heat sink for LEDs 111. LED strips 112 are mounted directed to LED mounts 136 which are integral structures defined by envelope 130 so that heat generated by strips 112 is transferred by conduction directly into the body of envelope 130. LED mounts 136 can be members that project down from the inner surface of envelope 130 with the members defining substantially vertical mounting surfaces for LED circuit board strips 112 as shown in FIG. 21. The vertical orientation of the mounting surface positions the LEDs 111 horizontally to output light substantially parallel to lens frame 108. In the exemplary configuration, each mount 136 is in the form of a solid beam integrally formed with envelope 130 such that it functions as a heat sink. The side of mount 136 opposite to the vertical mounting surface is spaced from the sidewall of envelope 130 as shown in FIGS. 18 and 21 to define a channel to receive the drive shafts 204 of the swing arm mounting assemblies described below. Envelope 130 also defines a plurality of heat fins 138 to increase the surface area of envelope 130 to transfer the heat out of envelope 130. Heat fins 138 are disposed immediately inward of mounts 136 just out of the way of the swing arm mounting assemblies 200 described below. When light guide plate 114, reflector 113, and diffuser 115 are carried by housing 106, they can be mounted to LED mounts 136.

Each end cap 132 defines a channel 140 that receives an end of envelope 130. A gasket 142 is disposed within channel 140 to create a sealed housing 106. Gasket 142 can be poured-in-place or self-supporting independent element that is added to channel 140 before the end of envelope 130 is inserted. Envelope 130 defines a plurality of channels 144 that receive the self-tapping threads of threaded connectors 146 that secure end caps 132 to envelope 130. In other configurations, different mechanical connectors can be used to secure end caps 132 to envelope 130 or adhesives or welds can be used to secure the elements together. Tightening connectors 146 pull envelope 130 into channels 140 against gasket 142 to define a hermetically sealed housing 106. This enclosure can be pressure tested and certified prior to the assembly of light fixture 102. When light guide plate 114, reflector 113, and diffuser 115 are carried by housing 106, they can be mounted to end caps 132. This structure can be configured to support enough weight to be walkable.

Figure 19:
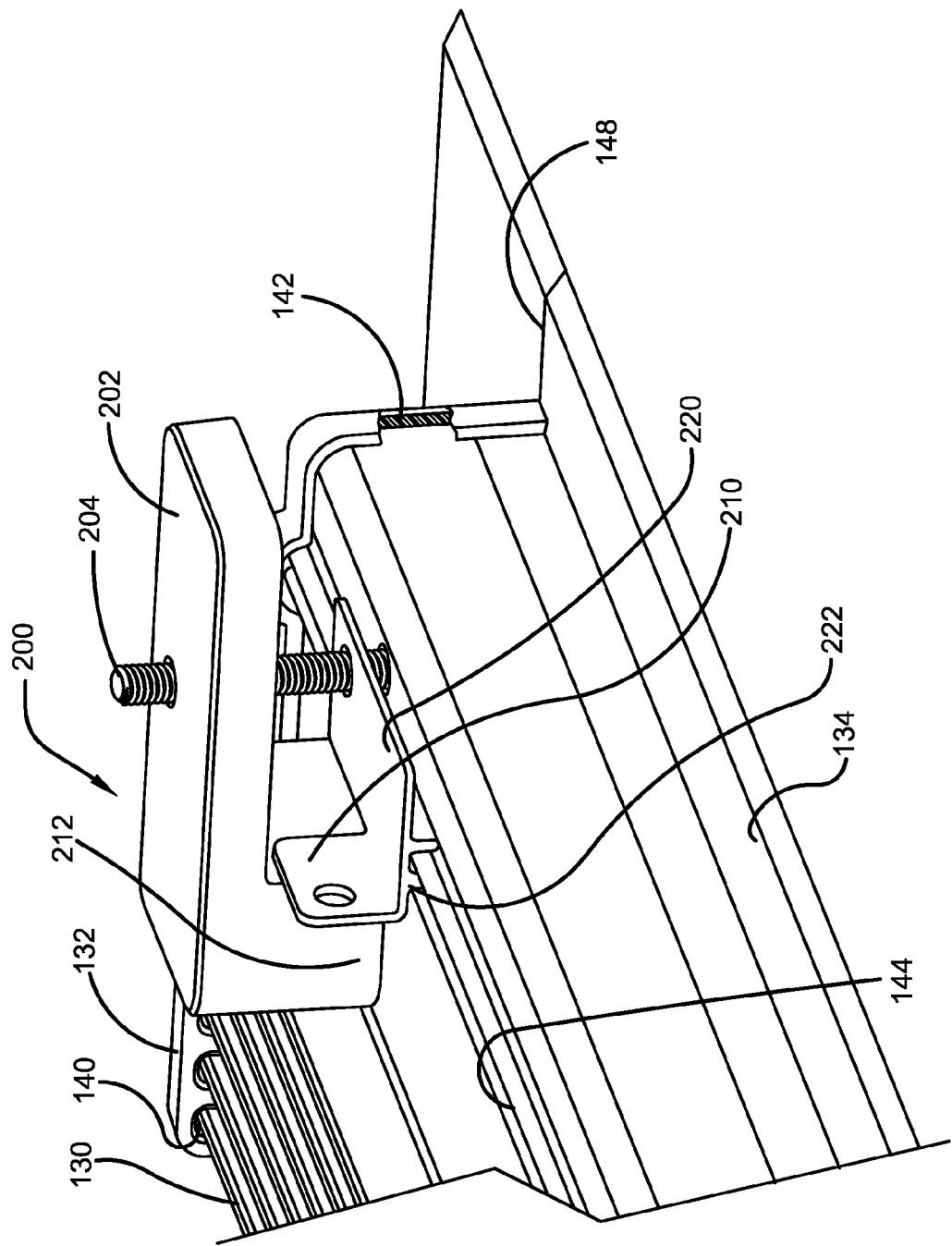
FIG. 19 is a perspective view of the mounting arm of the light fixture of FIG. 16.
Figure 20:
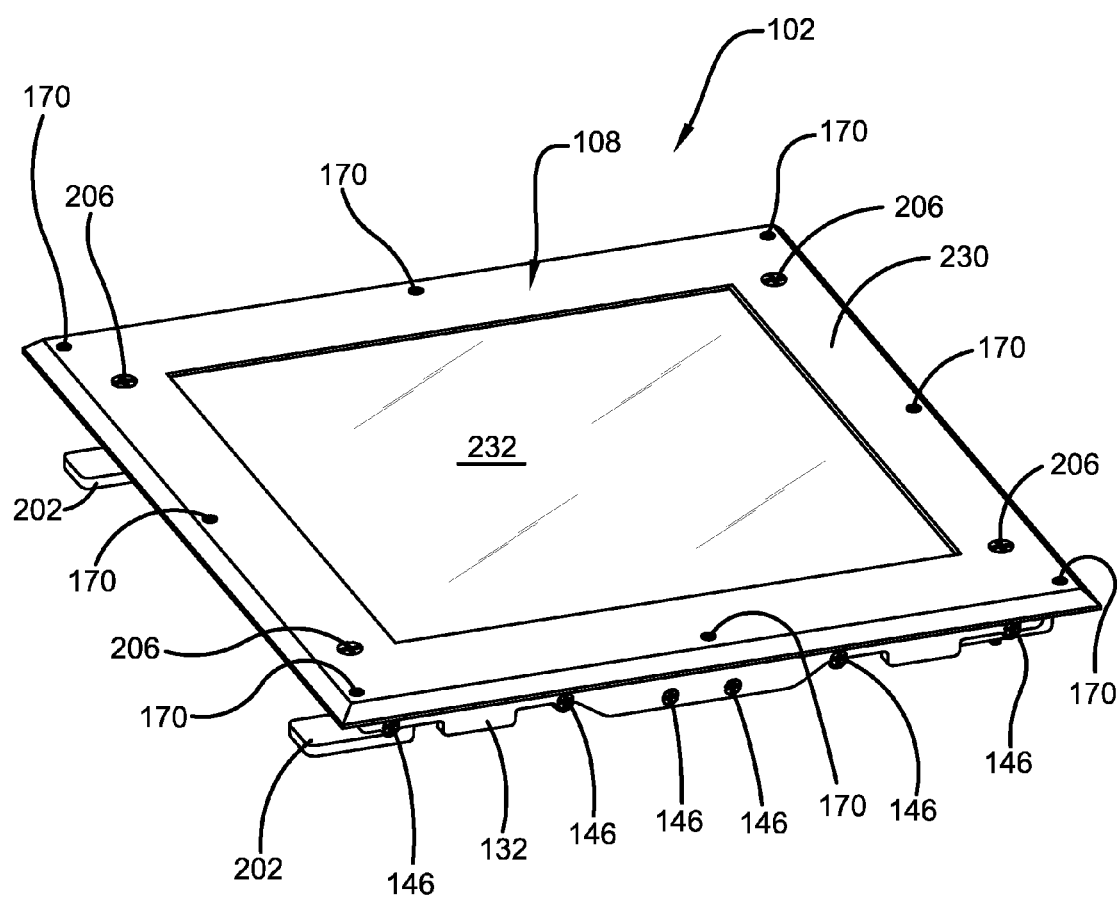
FIG. 20 is a perspective view of the light fixture of FIG. 16 with the mounting arms extended.

Envelope 130 and end caps 132 can be made from aluminum, galvanized steel, stainless steel, or a polymer. In one configuration, envelope 130 is formed from an aluminum extrusion that allows the length of light unit 102 to be defined by cutting the extrusion to the desired length. End caps 132 can be die cast aluminum. This allows the same extrusion die to be used to form envelope 130 for a light fixture having different lengths. The seam 148 shown in FIG. 19 depicts where the flange portion of end caps 132 abut the flange portion of envelope 130 to define the continuous upper surface of flange 134 that supports the gasket. When light guide plate 114, reflector 113, and diffuser 115 are carried by housing 106, they can be mounted to envelope 130.

End caps 132 define the height of housing 106 which can be configured for use with two inch thick ceiling panel system. This configuration prevents the body of light fixtures 102 from protruding up above the upper surface of a walkable ceiling which reduces tripping hazards. In one configuration of the light fixture 102, the height of housing 106 (excluding the swing arm mounting assemblies and connector 126) above the upwardly-facing mounting surface is no more than two inches.

Figure 23:
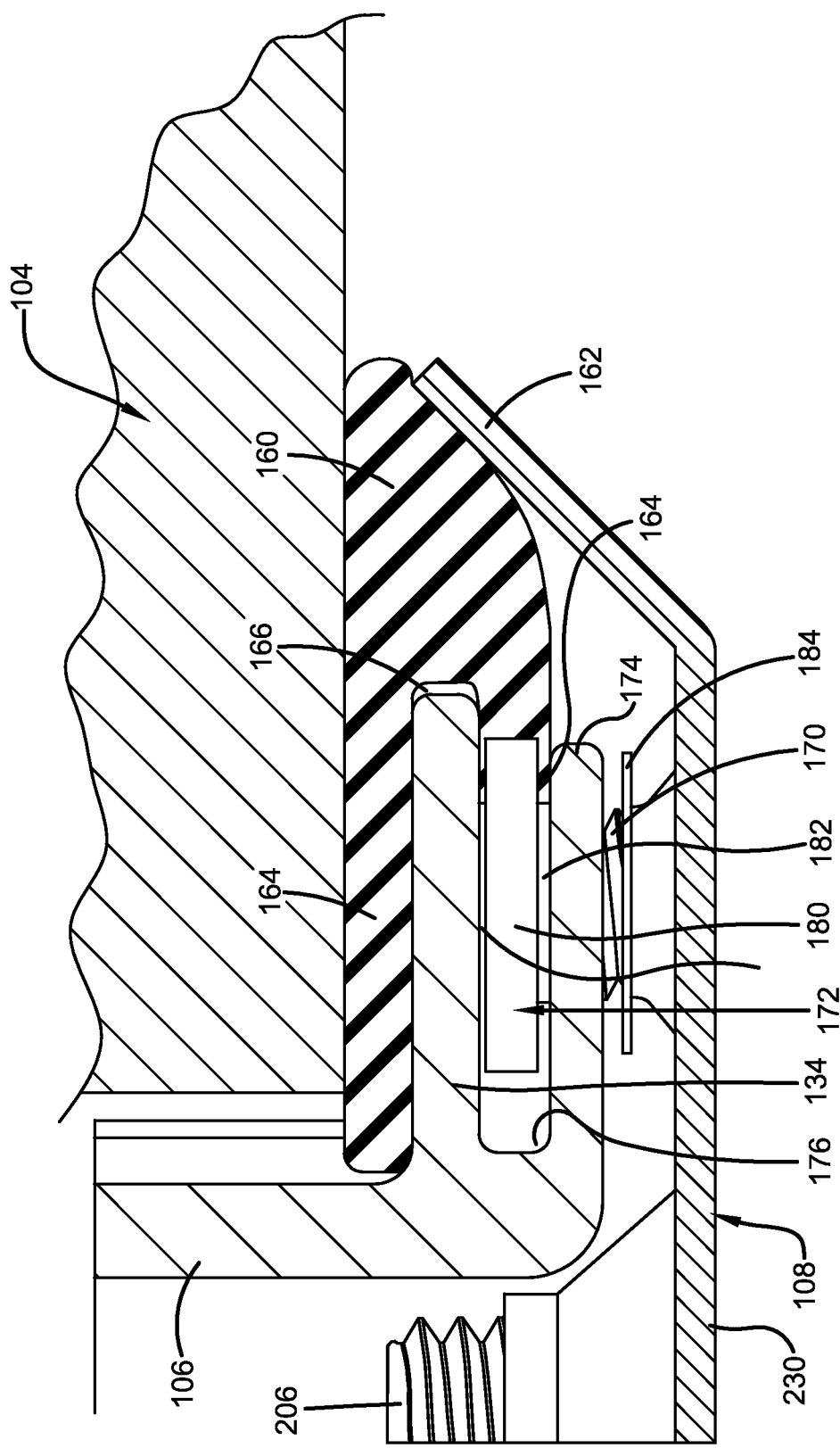
FIG. 23 is a section view showing the position of the gasket that is disposed between the flange and the lower surface of the ceiling when the light fixture is installed.

Flange 134 extends about the entire perimeter of housing 106 and carries the gasket 160. FIG. 23 depicts the arrangement of gasket 160, flange 134, lens frame 108, and ceiling 104. Gasket 160 provides a seal between the upper surface of flange 134 and the lower surface of ceiling 104. Gasket 160 also defines a seal between the upwardly angled lip 162 of lens frame 108 and ceiling 104. Gasket 160 also defines a seal between flange 134 and lens frame 108. Gasket 160 includes a pair of legs 164 spaced by a slot 166 that receives flange 134. An adhesive can be used to secure gasket 160 to flange 134. Gasket 160 can be a vulcanized rubber material.

Lens frame 108 is connected to housing 106 with a plurality of threaded connectors 170 that extend up through lens frame 108 at locations directly below flange 134 such that the threaded nuts 172 that receive connectors 170 are disposed outwardly of the side and end walls of housing 106 and close to angled lip 162 so that the force provided by tightening connectors 170 drives lip 162 into gasket 160. Connectors 170 can be disposed directly under flanges 134 and the upper leg gasket portion 164 while the lower leg 164 of gasket 160 can be cut out to provide room for the nuts 172 that receive connectors 170 or the lower leg 164 can be disposed between nut 172 and flange 134. A seal is used between each connector 170 and lens frame 108. The seal can be carried by lens frame 108, connector 170, or provided as a separate element that is added to connector 170. Nuts 172 are movably carried by housing 106 below flange 134. Connector mounting members 174 project from the sides of envelope 130 to define channels 176 under flange 134. A variety of structural members can be used for member 174 and a flange is depicted in the exemplary configuration. Connector mounting member 174 defines an opening, a notch, or a slot at each location of connector 170. A threaded nut 172 is movably disposed at each of these locations such that connector 170 will engage and automatically center nut 172 during assembly as connector 170 is tightened. Each nut 172 has a base 180 that is larger than the opening, notch, or slot. Base 180 is movably disposed in channel 176 and supports a threaded boss 182 that threadedly receives the threaded end of connector 170. Each end cap 132 defines connector support members 190 at the locations for nuts 172. The movable self-centering nuts help the user assemble lens frame 108 to housing 106 because the user does not have to perfectly align each connector 170 with each nut 172. Another feature that aids assembly is retainers 184 that hold connectors 170 to lens frame 108 after connectors are disconnected from nuts 172 to prevent connectors 170 from falling away from lens frame 108.

Light fixture 102 can be mounted by a user disposed below ceiling 104. The electrical connection is made prior to placing light fixture 102 up into the opening defined by ceiling 104. Another benefit provided by this configuration of light fixture 102 is that the user does not have to remove lens frame 108 to install or remove light fixture 102. Light fixture 102 includes a plurality of swing arm mounting assemblies 200 that allow the light fixture 102 to be secured to ceiling 104 from below. Each swing arm mounting assembly 200 includes a mounting arm 202 that is driven back and forth between an extended position and a retracted position by a drive shaft 204 that extends into housing 106 through a sealed opening in envelope 130. In the extended position, arm 202 is disposed above flange 134 such that it is disposed over the portion of ceiling 104 that engages flange 134. In the retracted position, arm 202 is disposed inward of flange 134 so that housing 106 can be fit up into an opening or removed from an opening defined by ceiling 104.

Each drive shaft 204 terminates within housing 106 above lens frame 108 outwardly of mounts 136 that support LED strips 112. Lens frame 108 defines access openings that are normally sealed with removable and replaceable sealing caps 206. Caps 206 can be threaded, twist-locked bayonet-style, or snap fit in place. During installation or removal, the user removes caps 206 to access drive shafts 204. The user can then rotate drive shafts 204 and thus mounting arms 202 with a tool such as a socket wrench, a hex wrench, or a screwdriver. Each cap 206 is disposed flush with the lower surface of lens frame 108 and is made from the same inert material as lens frame 108 such as stainless steel. Each cap 206 includes an integral seal that engages lens frame 108 to provide a hermetic seal when cap 206 is installed. The integral seal can be a gasket or an O-ring that is secured to cap 206 so that it will reliably engage the sealing seat defined by lens frame 108. The user thus only has to remove caps 206 to operate swing arm assemblies 200. The user can thus install light fixture 102 without changing the engagement of lens frame 108 with gasket 160 which helps maintain a good water tight and dust tight seal for the interior of housing 106.

Each mounting arm 202 rotates with its drive shaft 204 until mounting arm 202 engages a stop 210. When mounting arm 202 is disposed against a stop 210, rotation of drive shaft 204 adjusts the vertical position of mounting arm 202 with respect to housing 106 which allows the light fixture to be tightened to ceiling 104. In some configurations, each mounting arm 202 includes an enlarged end 212 that engages housing 106 to stop the adjustment to prevent overtightening. In some configurations, the enlarged end 212 is the portion of mounting arm 202 that engages the stop 210. A spring such as a torsion spring disposed can be disposed around drive shaft 204 to urge mounting arm 202 toward the extended or retracted position. In another configuration, a spring used to hold mounting arm upright. In one configuration, a coil spring is disposed around drive shaft 204 between mounting arm 202 and housing 106.

In the exemplary configuration, stop 210 is defined by a mounting tab 220 that is connected to envelope 130. Mounting tab 220 can be used to wire light fixture 102 to a structure above ceiling 104 if such support wiring is desired. Mounting tab 220 includes a foot 222 that slides into channel 144 defined by envelope 130. The sidewalls that define channel 144 also define a neck that is narrow compared to the body of channel such that a foot having an enlarged head and narrow neck can slide down channel 144 but cannot be pulled out vertically. Mounting tab 220 is fixed at this location by passing drive shaft 204 through mounting tab 220. A second foot can be disposed parallel to foot 222 to engage envelope 130 to support mounting tab 220.

Lens frame 108 generally includes a perimeter frame 230, a transparent lens 232, and caps 206. In some configurations, light guide plate 114, reflector 113, and diffuser 115 are also carried by lens frame 108. Lens 232 is sealed to perimeter frame 230. When carried by lens frame 108, light guide plate 114, reflector 113, and diffuser 115 are supported in a position that aligns plate 114 with LED strips 112 when lens frame 108 is connected to housing 106. Light guide plate 114 and lens 232 can be selected to provide desired lighting output in cooperation with LED strips 112. Light fixture 102 can be provided in 4000K, 5000K, and UV filtering amber configurations.

Lens frame 108 includes the surfaces of light fixture 102 that are exposed to the controlled environment in which light fixture 102 is being used. In some configurations, disinfectants or other chemicals are used in the controlled environment and lens frame 108 must be configured to not react with the materials. Mold treatment processes can corrode metals and stainless steel surfaces that have been compromised by welding or grinding. In one configuration of light fixture 102, perimeter frame 230 is formed from stainless steel. An 18 gauge stainless steel, type 304 or 316 can be used. Perimeter frame 230 is formed by a deep drawing and trimming fabrication method that does not degrade the chromium at the surface of perimeter frame 230 that is exposed to the controlled environment. As such, a perimeter frame 230 that is free of welds at the corners is provided for increase corrosion resistance. In some embodiments, all welding for stands to connect lens 232 or other components are energized from the inside surface of perimeter frame 230 with no room-side surface welding or grinding. This allows the entire exposed surface of perimeter frame 232 to maintain its surface integrity and allows light fixture 102 to be used without a protective coating or further surface treatments.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A light fixture for a controlled environment ceiling application, the light fixture comprising:
   an enclosure that includes a housing and a lens frame; the housing having an upwardly-facing mounting surface adapted to be disposed below the ceiling when the light fixture is installed;
   an LED light source disposed within the enclosure;
   a gasket carried by the housing; the gasket having a first portion for sealing the housing to the ceiling when the light fixture is installed in the ceiling; the first portion of the gasket being disposed on the upwardly-facing mounting surface;
   the gasket having a second portion disposed between the lens frame and the housing to seal the lens frame to the housing; and
   the entire gasket being disposed above the lens frame such that the gasket is concealed by the lens frame.

2. The light fixture of claim 1, further comprising a light guide plate disposed within the enclosure; the light guide plate having a plurality of edges; and the LED light source arranged to direct light into an edge of the light guide plate.

3. The light fixture of claim 1, wherein the lens frame includes a lens and wherein the LED light source is arranged to direct light in a direction substantially perpendicular to the lens of the lens frame.

4. The light fixture of claim 1, wherein the lens frame includes a lens and wherein the LED light source is arranged to direct light in a direction substantially parallel to the lens of the lens frame.

5. The light fixture of claim 1, wherein the housing includes an outwardly projecting flange that defines the upwardly-facing mounting surface; the gasket having first and second legs with the outwardly projecting flange disposed between the first and second legs of the gasket.

6. The light fixture of claim 5, wherein the housing includes a connector mounting member disposed below portions of the outwardly projecting flange to define a channel which receives the second leg of the gasket.

7. The light fixture of claim 1, further comprising connectors that connect the lens frame to the housing; the connectors being disposed directly under and aligned with the upwardly-facing mounting surface.

8. The light fixture of claim 7, further comprising a nut for each connector; each of the nuts being movably carried by the housing under the upwardly-facing mounting surface.

9. The light fixture of claim 8, wherein the housing includes a plurality of selectively movable swing arm mounting assemblies that are each movable between at least a first position and a second position; the second position of each swing arm mounting assembly locating a portion of the swing arm mounting assembly above the upwardly-facing mounting surface.

10. The light fixture of claim 9, wherein each of the movable swing arm mounting assemblies includes a drive shaft that extends into the housing inward of the upwardly-facing mounting surface.

11. The light fixture of claim 10, wherein the lens frame defines an access opening for each of the drive shafts such that the installer can access the drive shaft without removing the lens frame from the housing; and further comprising a cap sealing each access opening.

12. The light fixture of claim 1, wherein the housing defines an LED mount having a substantially vertical surface; the LED light source being mounted to the substantially vertical surface of the LED mount; the housing receiving heat from the LED light source through conduction to function as a heat sink.

13. The light fixture of claim 12, wherein the housing defines a plurality of fins used to increase surface area of the housing to remove heat from the housing.

14. The light fixture of claim 13, wherein the housing includes an extruded aluminum envelope disposed between first and second aluminum end caps; the extruded aluminum envelope defining the plurality of fins.

15. The light fixture of claim 14, further comprising an LED power supply disposed within the enclosure.

16. A light fixture for a controlled environment ceiling application, the light fixture comprising:
   an enclosure that includes a housing and a lens frame; the housing having a flange that defines an upwardly-facing mounting surface adapted to be disposed below the ceiling when the light fixture is installed;
   an LED light source disposed within the enclosure;
   a gasket carried by the housing; the gasket having a first portion for sealing the housing to the ceiling when the light fixture is installed in the ceiling; the first portion of the gasket being disposed on the upwardly-facing mounting surface;
   the gasket having a second portion disposed between the lens frame and the housing to seal the lens frame to the housing;
   the gasket having first and second legs with the flange disposed between the first and second legs of the gasket; and
   wherein the housing includes a connector mounting member disposed below portions of the flange to define a channel which receives the second leg of the gasket.

17. The light fixture of claim 16, further comprising a light guide plate disposed within the enclosure; the light guide plate having a plurality of edges; and the LED light source arranged to direct light into an edge of the light guide plate.

18. The light fixture of claim 16, wherein the lens frame includes a lens and wherein the LED light source is arranged to direct light in a direction substantially perpendicular to the lens of the lens frame.

19. The light fixture of claim 16, wherein the lens frame includes a lens and wherein the LED light source is arranged to direct light in a direction substantially parallel to the lens of the lens frame.

20. The light fixture of claim 16, further comprising connectors that connect the lens frame to the housing; the connectors being disposed directly under and aligned with the upwardly-facing mounting surface.

21. The light fixture of claim 20, further comprising a nut for each connector; each of the nuts being movably carried by the housing under the upwardly-facing mounting surface.

22. The light fixture of claim 21, wherein the housing includes a plurality of selectively movable swing arm mounting assemblies that are each movable between at least a first position and a second position; the second position of each swing arm mounting assembly locating a portion of the swing arm mounting assembly above the upwardly-facing mounting surface.

23. The light fixture of claim 22, wherein each of the movable swing arm mounting assemblies includes a drive shaft that extends into the housing inward of the upwardly-facing mounting surface.

24. The light fixture of claim 23, wherein the lens frame defines an access opening for each of the drive shafts such that the installer can access the drive shaft without removing the lens frame from the housing; and further comprising a cap sealing each access opening.

25. The light fixture of claim 16, wherein the housing defines an LED mount having a substantially vertical surface; the LED light source being mounted to the substantially vertical surface of the LED mount; the housing receiving heat from the LED light source through conduction to function as a heat sink.

26. The light fixture of claim 25, wherein the housing defines a plurality of fins used to increase surface area of the housing to remove heat from the housing.

27. The light fixture of claim 26, wherein the housing includes an extruded aluminum envelope disposed between first and second aluminum end caps; the extruded aluminum envelope defining the plurality of fins.

28. The light fixture of claim 27, further comprising an LED power supply disposed within the enclosure.

29. A light fixture for a controlled environment ceiling application, the light fixture comprising:
an enclosure that includes a housing and a lens frame; the housing having an upwardly-facing mounting surface adapted to be disposed below the ceiling when the light fixture is installed;
an LED light source disposed within the enclosure;
a gasket carried by the housing; the gasket having a first portion for sealing the housing to the ceiling when the light fixture is installed in the ceiling; the first portion of the gasket being disposed on the upwardly-facing mounting surface;
the gasket having a second portion disposed between the lens frame and the housing to seal the lens frame to the housing; and
connectors that connect the lens frame to the housing; the connectors being disposed directly under and aligned with the upwardly-facing mounting surface.

30. The light fixture of claim 29, further comprising a light guide plate disposed within the enclosure; the light guide plate having a plurality of edges; and the LED light source arranged to direct light into an edge of the light guide plate.

31. The light fixture of claim 29, wherein the lens frame includes a lens and wherein the LED light source is arranged to direct light in a direction substantially perpendicular to the lens of the lens frame.

32. The light fixture of claim 29, wherein the lens frame includes a lens and wherein the LED light source is arranged to direct light in a direction substantially parallel to the lens of the lens frame.

33. The light fixture of claim 29, wherein the housing includes an outwardly projecting flange that defines the upwardly-facing mounting surface; the gasket having first and second legs with the outwardly projecting flange disposed between the first and second legs of the gasket.

34. The light fixture of claim 33, wherein the housing includes a connector mounting member disposed below portions of the outwardly projecting flange to define a channel which receives the second leg of the gasket.

35. The light fixture of claim 29, further comprising a nut for each connector; each of the nuts being movably carried by the housing under the upwardly-facing mounting surface.

36. The light fixture of claim 35, wherein the housing includes a plurality of selectively movable swing arm mounting assemblies that are each movable between at least a first position and a second position; the second position of each swing arm mounting assembly locating a portion of the swing arm mounting assembly above the upwardly-facing mounting surface.

37. The light fixture of claim 36, wherein each of the movable swing arm mounting assemblies includes a drive shaft that extends into the housing inward of the upwardly-facing mounting surface.

38. The light fixture of claim 37, wherein the lens frame defines an access opening for each of the drive shafts such that the installer can access the drive shaft without removing the lens frame from the housing; and further comprising a cap sealing each access opening.

39. The light fixture of claim 29, wherein the housing defines an LED mount having a substantially vertical surface; the LED light source being mounted to the substantially vertical surface of the LED mount; the housing receiving heat from the LED light source through conduction to function as a heat sink.

40. The light fixture of claim 39, wherein the housing defines a plurality of fins used to increase surface area of the housing to remove heat from the housing.

41. The light fixture of claim 40, wherein the housing includes an extruded aluminum envelope disposed between first and second aluminum end caps; the extruded aluminum envelope defining the plurality of fins.

42. The light fixture of claim 41, further comprising an LED power supply disposed within the enclosure.

* * * * *